(12) United States Patent
Yasui et al.

(10) Patent No.: US 10,353,071 B2
(45) Date of Patent: Jul. 16, 2019

(54) TRAFFIC MEASURING DEVICE

(71) Applicant: DENSO WAVE INCORPORATED, Chita-gun, Aichi-pref. (JP)

(72) Inventors: Kunio Yasui, Chita-gun (JP); Tetsuya Iwasaki, Kariya (JP)

(73) Assignee: DENSO WAVE INCORPORATED, Agui-cho (JP)

( * ) Notice: Subject to any disclaimer, the term of this patent is extended or adjusted under 35 U.S.C. 154(b) by 375 days.

(21) Appl. No.: 15/331,142

(22) Filed: Oct. 21, 2016

(65) Prior Publication Data

US 2017/0146655 A1    May 25, 2017

(30) Foreign Application Priority Data

Nov. 25, 2015    (JP) ................... 2015-229601

(51) Int. Cl.

| | |
|---|---|
| *G01C 3/08* | (2006.01) |
| *G01S 17/58* | (2006.01) |
| *G01P 3/36* | (2006.01) |
| *G01S 17/02* | (2006.01) |
| *G01P 3/68* | (2006.01) |
| *G01S 17/42* | (2006.01) |
| *G01S 7/48* | (2006.01) |

(52) U.S. Cl.
CPC ............... *G01S 17/58* (2013.01); *G01P 3/36* (2013.01); *G01P 3/68* (2013.01); *G01S 7/4808* (2013.01); *G01S 17/026* (2013.01); *G01S 17/42* (2013.01)

(58) Field of Classification Search
CPC ........... G01P 3/36; G01P 3/68; G01S 17/026; G01S 17/58; G01S 17/42; G01S 7/4808
USPC ........................................... 356/5.09
See application file for complete search history.

(56) References Cited

U.S. PATENT DOCUMENTS

| | | | | |
|---|---|---|---|---|
| 5,552,893 A | * | 9/1996 | Akasu ............... | G01C 3/00 356/4.01 |
| 6,304,321 B1 | * | 10/2001 | Wangler ............ | G01S 17/89 356/398 |
| 8,665,454 B2 | * | 3/2014 | Fowler ............... | G01S 17/42 356/601 |

FOREIGN PATENT DOCUMENTS

JP    2015-102524 A    6/2015

\* cited by examiner

*Primary Examiner* — Mark Hellner
(74) *Attorney, Agent, or Firm* — Oliff PLC

(57) ABSTRACT

A traffic measuring device includes: an irradiation part to irradiate laser light at an irradiation angle of predetermined interval to form a scan layer inclined upward or downward in a gravity direction; a light receiving part to receive the laser light irradiated from the irradiation part and reflected by a vehicle; and a distance acquisition part that detects a distance to the vehicle as a detection distance for each irradiation angle using the laser light received by the light receiving part. The distance acquisition part acquires a group of the detection distance relative to a whole of the scan layer. The traffic measuring device further includes a width calculation part that computes a width of the vehicle using a shortest distance, a shortest time irradiation angle, a longest distance, and a longest time irradiation angle.

9 Claims, 10 Drawing Sheets

TRAFFIC MEASURING DEVICE

CROSS REFERENCE TO RELATED APPLICATION

This application is based on Japanese Patent Application No. 2015-229601 filed on Nov. 25, 2015, the disclosure of which is incorporated herein by reference in its entirety.

TECHNICAL FIELD

The present disclosure relates to a traffic measuring device.

BACKGROUND

JP 2015-102524A describes a system which measures a speed of a vehicle traveling on a road utilizing a distance measuring apparatus using laser light. The measuring system detects the speed of a vehicle travelling into a predetermined area. The measuring system acquires the environment information such as congestion degree around the vehicle travelling on the road based on the speed of the vehicle.

SUMMARY

However, in order to suitably acquire the road situation around the vehicle, it is insufficient to detect just the speed of the vehicle. Specifically, it is necessary to distinguish the vehicle kind such as large-size vehicle or small-size vehicle, in addition to the speed of the vehicle. In details, it is necessary to acquire not only the speed of the vehicle but the size such as width, length, and height of the vehicle, while the conventional system detects only the speed of the vehicle. A sensor for measuring the size of the vehicle is needed separately for the conventional system. However, new installation space is needed for adding the sensor. Further, when a space on the road is not enough, it is difficult to add the sensor.

It is an object of the present disclosure to provide a traffic measuring device which acquires information about a size of a vehicle without addition of an apparatus for which new installation space is needed.

According to an aspect of the present disclosure, a scan layer where an irradiation part irradiates laser light is set in a virtual plane inclined upward or downward in a gravity direction as the laser light travels more distant from a road surface of the road. That is, the scan layer is not parallel to the road surface, and is angled relative to the road surface. Therefore, the vehicle passing through the inclined scan layer can be detected in three-dimension, in other words, not only the front surface but also the lateral surface.

According to an aspect of the present disclosure, a traffic measuring device that measures a traffic around a vehicle travelling on a road includes: an irradiation part disposed adjacent to the road to irradiate laser light at an irradiation angle of a predetermined interval to form a scan layer set in a virtual plane inclined upward or downward in a gravity direction as the laser light travels more distant from a road surface of the road; a light receiving part disposed adjacent to the road to receive the laser light irradiated from the irradiation part and reflected by the vehicle; a distance acquisition part that detects a distance to the vehicle as a detection distance for each irradiation angle using the laser light received by the light receiving part, the distance acquisition part acquiring a group of the detection distances relative to a whole of the scan layer; and a width calculation part that computes a width of the vehicle using a shortest distance which is the shortest among the group of the detection distances, a shortest time irradiation angle which is the irradiation angle corresponding to the shortest distance, a longest distance which is the longest among the group of the detection distances at the irradiation angle larger than the shortest time irradiation angle, and a longest time irradiation angle which is the irradiation angle corresponding to the longest distance.

In other words, the width of the vehicle is computed using the group of detection distances at a given irradiation angle acquired by the distance acquisition part when the vehicle passes through the inclined scan layer. Specifically, when the vehicle passes through the inclined scan layer, the end surface of the vehicle such as the front end or back end on the side adjacent to the light receiving part provides the shortest distance where the detection distance is the shortest. The irradiation angle corresponding to the shortest distance is the shortest time irradiation angle. In contrast, the end surface on the side far from the light receiving part provides the longest distance where the detection distance is the longest, and the longest time irradiation angle is larger than the shortest time irradiation angle. That is, of the front end and the back end of the vehicle, the detection distance becomes the longest on the side far from the light receiving part at the longest time irradiation angle larger than the shortest time irradiation angle. The width of the vehicle is computed by processing by trigonometric functions using the shortest distance, the shortest time irradiation angle, the longest distance, and the longest time irradiation angle. Therefore, the width information of the vehicle can be acquired without addition of apparatus for which new installation space is needed.

According to an aspect of the present disclosure, the length of the vehicle is computed using the group of detection distances at a given irradiation angle acquired by the distance acquisition part when the vehicle passes through the inclined scan layer. Specifically, when the vehicle passes through the inclined scan layer, the lateral surface of the vehicle at the end adjacent to the light receiving part provides the shortest distance where the detection distance becomes the shortest. The irradiation angle corresponding to the shortest distance is an shortest time irradiation angle. In contrast, the lateral surface of the vehicle at the other end distant from the light receiving part provides the longest distance where the detection distance becomes the longest, and the longest time irradiation angle is smaller than the shortest time irradiation angle. That is, at the end distant from the light receiving part, the detection distance becomes the longest at the longest time irradiation angle smaller than the shortest time irradiation angle, of the side surface of the vehicle. The length of the vehicle is computed by processing by trigonometric functions using the shortest distance, the shortest time irradiation angle, the longest distance, the longest time irradiation angle, and the inclination angle defined between the scan layer and the road surface. Therefore, the length information of the vehicle can be acquired without addition of apparatus for which new installation space is needed.

According to an aspect of the present disclosure, the height of the vehicle is computed using the group of detection distances at a given irradiation angle acquired by the distance acquisition part when the vehicle passes through the inclined scan layer. Specifically, when the vehicle passes through the inclined scan layer, the maximum detection height is acquired at which the height from the light receiving part to the vehicle is the maximum at an irradiation angle. The maximum detection height is equivalent to a height dimension from the light receiving part to a highest portion of the vehicle. While the light receiving part is located adjacent to the road, the road surface is not necessarily equal to the installation position of the light receiving part. Then, the height calculation part corrects the maximum detection height acquired from the group of the detection distances by the height from the road surface to the light receiving part, i.e., the installation height of the light receiving part from the road surface. Thereby, the height calculation part computes the height of the vehicle as a vehicle height. Therefore, the vehicle height information can be acquired without addition of apparatus for which new installation space is needed.

For example, a traffic measuring device may further have a speed calculation part. The speed calculation part computes the speed of the vehicle using at least two of the detection distances acquired from the distance acquisition part at a predetermined time interval. Thereby, the speed can be detected without addition of apparatus, in addition to the width, the length or the height.

The distance acquisition part may acquire the detection distance when the whole vehicle advances and is located within the scan layer. The irradiation part irradiates laser light to form the scan layer at a scanning cycle of a predetermined time interval. Therefore, there is a possibility that the group of detection distances may not be acquired relative to the whole vehicle depending on the speed of the vehicle which advances into the scan layer or the irradiable distance of the laser light. The distance acquisition part detects the detection distance at a given irradiation angle as the group of the detection distances, after it is confirmed that the whole vehicle is located within the scan layer. Therefore, the size information of the vehicle can be acquired more accurately.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

A traffic measuring device according to an embodiment is described based on the drawings.

Figure 2:
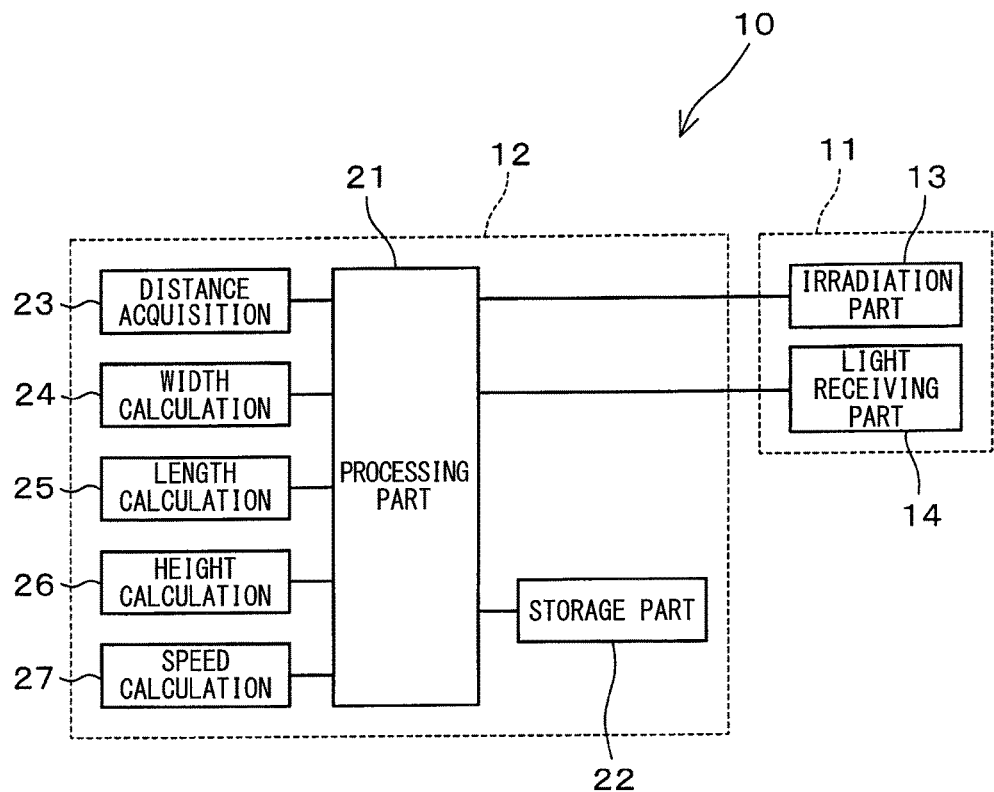
FIG. 2 is block diagram illustrating the traffic measuring device.
Figure 3:
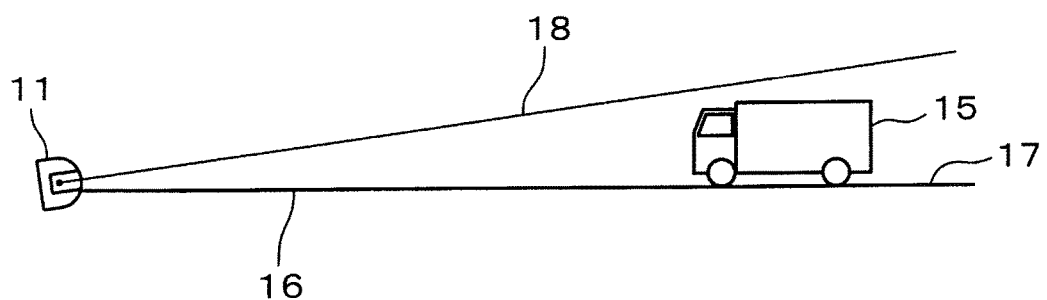
FIG. 3 is a diagram illustrating the traffic measuring device disposed near a road surface.
Figure 4:
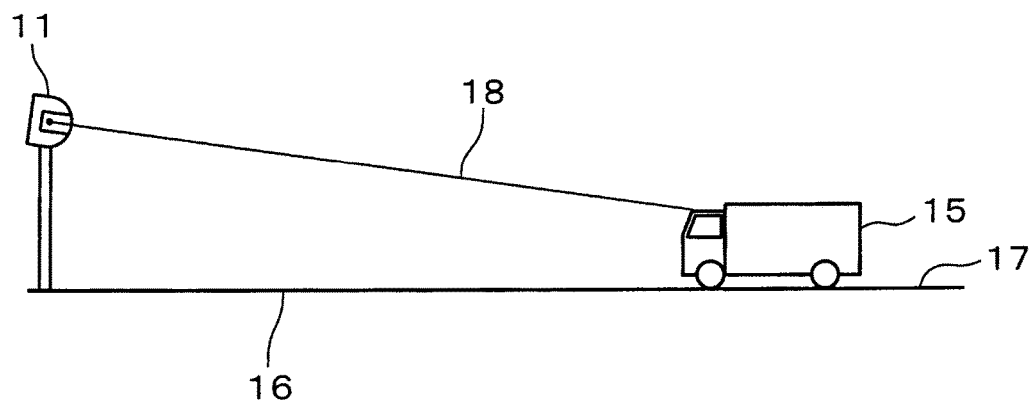
FIG. 4 is a diagram illustrating the traffic measuring device disposed distant from a road surface.
Figure 5:
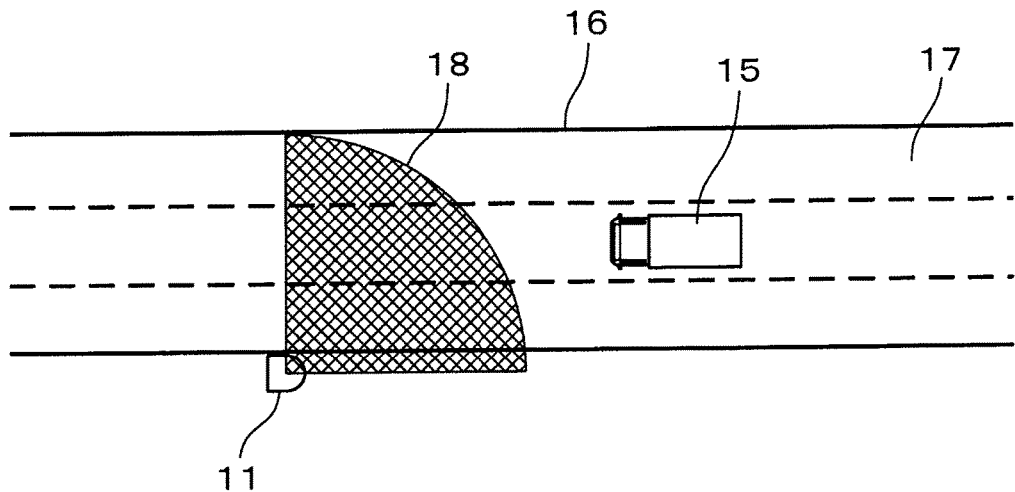
FIG. 5 is a diagram illustrating the traffic measuring device disposed at a road shoulder.
Figure 6:
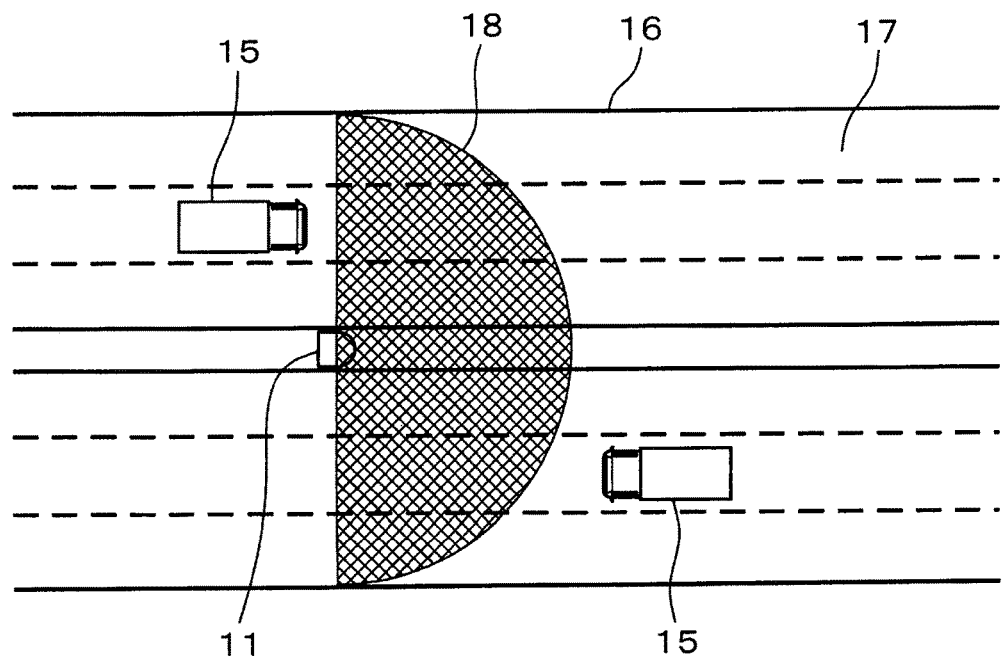
FIG. 6 is a diagram illustrating the traffic measuring device disposed at the center of a road.

As shown in FIG. 2, the traffic measuring device 10 includes a sensor unit 11 and a control unit 12. The sensor unit 11 has an irradiation part 13 and a light receiving part 14. As shown in FIG. 3 and FIG. 4, the sensor unit 11 is disposed adjacent to a road 16 on which a vehicle 15 travels. The sensor unit 11 may be disposed at a comparatively low position near a road surface 17 of the road 16 shown in FIG. 3, or at a comparatively high position separated from the road surface 17 of the road 16 shown in FIG. 4. Moreover, the sensor unit 11 is located at a road shoulder of the road 16, as shown in FIG. 5. In this case, the sensor unit 11 measures the vehicle 15 travelling through one side lane of the road 16. As shown in FIG. 6, the sensor unit 11 may be located at the center of the road 16. In this case, the sensor unit 11 can measure the vehicles 15 travelling through the both side lanes of the road 16. In this embodiment, the sensor unit 11 is disposed at the road shoulder of the road 16, as shown in FIG. 5.

The irradiation part 13 of the sensor unit 11 irradiates laser light at an irradiation angle of a predetermined interval. The interval of the irradiation angle of laser light is equivalent to the resolution for measuring the vehicle 15, and can be suitably set according to a desired performance. As the interval of the irradiation angle is made smaller, the resolution improves, and the load of the processing in the control unit 12 increases. The laser light irradiated at the irradiation angle of the predetermined interval forms a scan layer 18 which detects the vehicle 15.

As shown in FIG. 3 and FIG. 4, the scan layer 18 is set as a virtual plane inclined relative to the road surface 17 of the road 16. Specifically, as shown in FIG. 3, when the sensor unit 11 is arranged at the position near the road surface 17 of the road 16, the scan layer 18 inclines upward in the gravity direction relative to the road surface 17. When the sensor unit 11 is arranged at a position distant from the road surface 17 of the road 16, as shown in FIG. 4, the scan layer 18 inclines downward in the gravity direction relative to the road surface 17.

Namely, as the scan layer 18 travels from the sensor unit 11 away from the sensor unit 11 relative to the road surface 17 which is approximately flat, the virtual plane of the scan layer 18 inclines upward or downward in the gravity direction. More specifically, as shown in FIG. 3, when the sensor unit 11 is arranged at the position near the road surface 17 of the road 16, the scan layer 18 inclines upward relative to the road surface 17 away from the road surface 17, as the distance from the sensor unit 11 becomes larger. When the sensor unit 11 is arranged at the position distant from the road surface 17 of the road 16, as shown in FIG. 4, the scan layer 18 inclines relative to the road surface 17 downward to approach the road surface 17, as the distance from the sensor unit 11 becomes larger. The scan layer 18 does not intersect perpendicularly to the road surface 17 because a light reflected by the vehicle 15 cannot be received by the light receiving part 14.

The laser light irradiated from the irradiation part 13 is reflected by the vehicle 15 entering the scan layer 18. The laser light reflected by the vehicle 15 reaches the light receiving part 14 of the sensor unit 11. The light receiving part 14 receives the laser light reflected by the vehicle 15. The irradiation part 13 and the light receiving part 14 may be formed integrally with each other, or may be provided separately from each other.

The control unit 12 may be integrally formed with the sensor unit 11 at the same position, or may be provided separately from the sensor unit 11 at a position distant from the sensor unit 11. In this embodiment, the sensor unit 11 and the control unit 12 are formed integrally with each other at the same position.

The control unit 12 has a processing part 21 with CPU, ROM, and RAM which are not illustrated. The control unit 12 further has a storage part 22. The storage part 22 may be used commonly with ROM and RAM of the processing part 21. The control unit 12 executes a computer program memorized by ROM, to realize a distance acquisition part 23, a width calculation part 24, a length calculation part 25, a height calculation part 26, and a speed calculation part 27 by software. Alternatively, the distance acquisition part 23, the width calculation part 24, the length calculation part 25, the height calculation part 26, and the speed calculation part 27 may be realized by hardware or collaboration with software and hardware.

The distance acquisition part 23 of the control unit 12 acquires the distance from the sensor unit 11 to the vehicle 15 based on time taken for the light irradiated from the irradiation part 13 to enter the light receiving part 14 after being reflected by the vehicle 15 to be targeted. Specifically, the sensor unit 11 irradiates laser light at the irradiation angle of the predetermined interval in the scan layer 18 as mentioned above. Therefore, the distance acquisition part 23 acquires the distance to the vehicle as a detection distance with respect to each irradiation angle. The distance acquisition part 23 acquires the detection distances for each irradiation angle in the scan layer 18 as a group of the detection distances relative to the whole scan layer 18.

Figure 1:
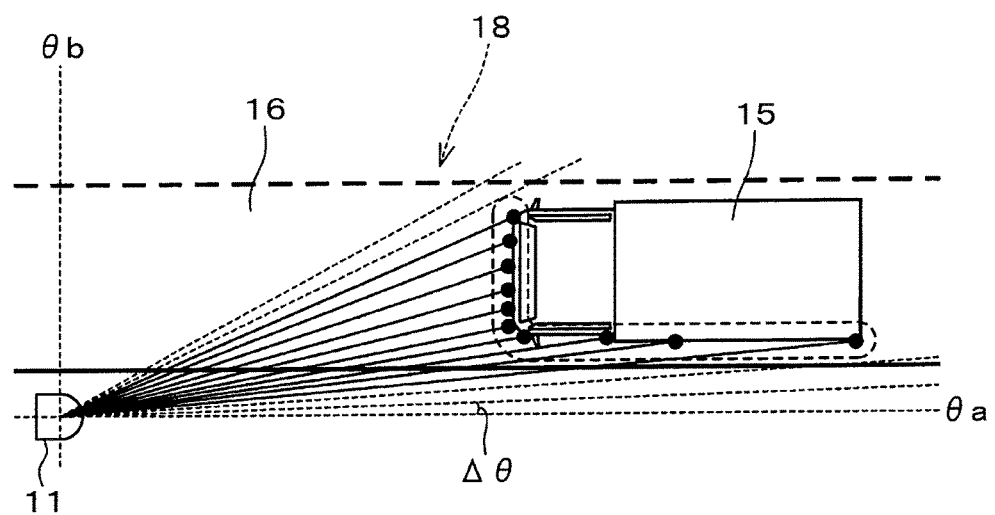
FIG. 1 is a diagram illustrating a relation between a vehicle and a scan layer of a traffic measuring device according to an embodiment.

That is, as shown in FIG. 1, the distance acquisition part 23 sets the irradiation angle by a predetermined interval Δθ from one reference position θa to the other reference position θb of the irradiation angle in the scan layer 18, and acquires the distance to the vehicle 15 as a detection distance for each irradiation angle. The distance acquisition part 23 memorizes temporarily the detection distance for each irradiation angle acquired in the whole scan layer 18 to the storage part 22 as the group of the detection distances. The detection distance included in the group of detection distances is restricted to the distance to the vehicle 15 acquired by the laser light reflected by the vehicle 15. The laser light irradiated from the sensor unit 11 is not always reflected by the vehicle 15 depending on the irradiation angle. If the detection distance cannot be acquired at an irradiation angle where the laser light is not reflected by the vehicle 15, the detection distance at the irradiation angle concerned is not included in the group of detection distances.

Figure 7:
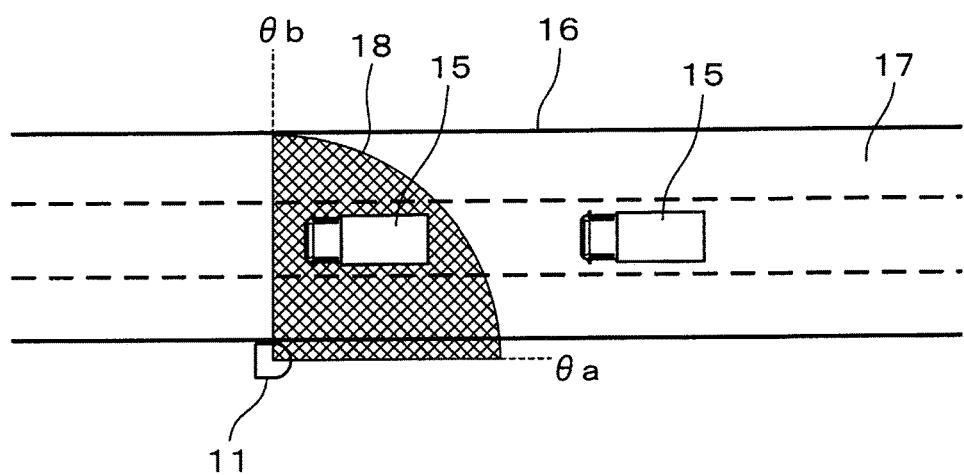
FIG. 7 is a diagram illustrating a relation between vehicles and a scan layer of the traffic measuring device.

As shown in FIG. 7, the distance acquisition part 23 acquires the detection distance for each irradiation angle as the group of detection distances, after the whole vehicle 15 travelling on the road 16 is located within the scan layer 18. Since the vehicle 15 is running on the road 16, depending on the timing when the distance acquisition part 23 acquires the detection distance, only a part of the vehicle 15 is in the scan layer 18. If the group of detection distances is acquired while only a part of the vehicle 15 is in the scan layer 18, the exact width, length, height, and speed of the vehicle 15 cannot be obtained. The distance acquisition part 23 acquires the group of detection distances after it is confirmed that the whole vehicle 15 is in the scan layer 18, not immediately after the vehicle 15 advances into the scan layer 18.

Specifically, the irradiation part 13 scans the whole scan layer 18 at a preset scanning cycle, for example, from several milliseconds to several seconds. At this time, it can be determined whether a part or all the vehicle 15 is within the scan layer 18, by using the detection distance acquired for every scanning cycle. For example, the distance acquisition part 23 determines whether the whole vehicle 15 is within the scan layer 18 using distribution of the detection distance included in the group of detection distances, or the speed of the vehicle 15 obtained from the group of detection distances.

The width calculation part 24 computes the width of the vehicle 15 as a width using the detection distances included in the group of detection distances. The length calculation part 25 computes the length of the vehicle 15 as a length using the detection distances included in the group of detection distances. The height calculation part 26 computes the height of the vehicle 15 as a height using the detection distances included in the group of detection distances. The speed calculation part 27 computes the speed of the vehicle 15 as a speed using the detection distances included in the group of detection distances.

Next, the acquisition of the group of detection distances and a concrete calculation of width, length, height, and speed of the vehicle are explained in detail, in case where the sensor unit 11 is disposed at the road shoulder of the road 16, and where the vehicle 15 enters the scan layer 18 formed by the sensor unit 11 from left side in FIG. 1.

(Acquisition of Group of Detection Distances)

As shown in FIG. 1, the irradiation part 13 irradiates laser light at an irradiation angle of a predetermined interval in the scan layer 18. The irradiation part 13 scans the scan layer 18 by laser light at a predetermined scanning cycle. Laser light reflected by the target vehicle 15 is incident into the light receiving part 14. The distance acquisition part 23 acquires the distance from the sensor unit 11 to the target vehicle 15 as a detection distance using the laser light incident into the light receiving part 14. Specifically, the distance acquisition part 23 computes the distance to the vehicle 15 based on the time period taken from when laser light is irradiated from the irradiation part 13 to when the light receiving part 14 receives the reflected light, for each irradiation angle set by the predetermined interval Δθ. The distance acquisition part 23 acquires the detection distance at a given irradiation angle of the scan layer 18, and acquires the group of detection distances by collecting the detection distances at all the irradiation angles. Generally, a clustering refers to create the group of the detection distances by collecting the detection distances.

(Calculation of Width)

Figure 8:
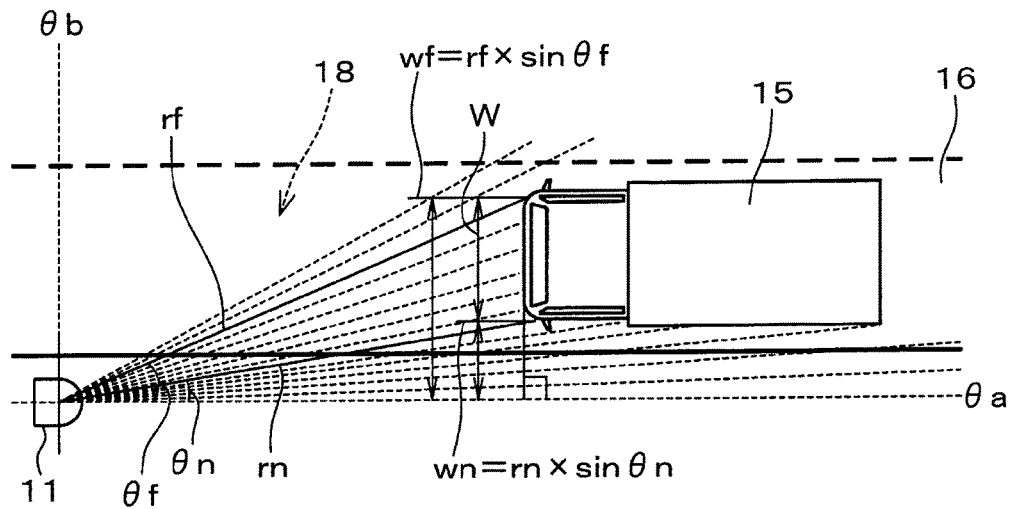
FIG. 8 is a diagram for explaining calculation of a width of a vehicle by the traffic measuring device.

The width calculation part 24 computes the width of the vehicle 15 as the width W using the detection distances included in the group of detection distances obtained by the distance acquisition part 23. As shown in FIG. 1 and FIG. 8, the group of detection distances obtained by the distance acquisition part 23 includes the detection distance at the front face and the side (lateral) face of the vehicle 15. The shortest distance rn where the distance to the vehicle 15 serves as the shortest is included in the group of detection distances. The shortest distance rn corresponds to the forward left end of the vehicle 15, when the vehicle 15 enters the scan layer 18 from left in FIG. 8. Thus, the shortest distance rn where the distance to the detected vehicle 15 serves as the shortest is included in the group of detection distances. Moreover, at this time, the irradiation angle corresponding to the shortest distance rn is defined as a shortest time irradiation angle θn. The shortest time irradiation angle θn satisfies a relationship of θa<θn<θb.

The group of detection distances includes the longest distance rf where the detection distance to the vehicle 15 serves as the longest at an irradiation angle larger than the shortest time irradiation angle θn. The longest distance rf corresponds to the forward right end of the vehicle 15, when the vehicle 15 advances into the scan layer 18 from left in FIG. 8. Thus, the longest distance rf where the distance to the detected vehicle 15 serves as the longest at an irradiation angle larger than the shortest time irradiation angle θn is included in the group of detection distances. Moreover, at this time, the irradiation angle at which the longest distance if is detected is defined as a longest time irradiation angle θf that satisfies a relationship of θn<θf<θb.

The width calculation part 24 computes the width W using the shortest distance rn, the shortest time irradiation angle θn, the longest distance rf, and the longest time irradiation angle θf. Specifically, as shown in FIG. 8, the width W is equal to a difference between the position wf corresponding to the forward right end of the vehicle 15 and the position wn corresponding to the forward left end of the vehicle 15 (W=wf−wn) in the width direction of the road 16, when the sensor unit 11 is referenced as an origin point. The shortest distance rn and the longest distance rf are equivalent to the distance from the sensor unit 11 to the vehicle 15, and are different from the position wn corresponding to the forward left end of the vehicle and the position wf corresponding to the forward right end of the vehicle, respectively.

The width calculation part 24 computes the position wn and the position wf in the width direction of the road 16 using trigonometric functions. The shortest distance rn, the shortest time irradiation angle θn, the longest distance rf, and the longest time irradiation angle θf are included in the group of detection distances as mentioned above. That is, the position wn corresponding to the forward left end of the vehicle 15 is computable as wn=rn×sin θn. Moreover, the position wf corresponding to the forward right end of the vehicle 15 is computable as wf=rf×sin θf. Therefore, the width calculation part 24 computes the width W as W=wf−wn, i.e., $$W = rf \times \sin\theta f - rn \times \sin\theta n.$$

Thus, the width calculation part 24 computes the width W of the vehicle 15 advanced into the scan layer 18 using the shortest distance rn, the shortest time irradiation angle θn, the longest distance rf, and the longest time irradiation angle θf included in the group of detection distances.

(Calculation of length)

Figure 9:
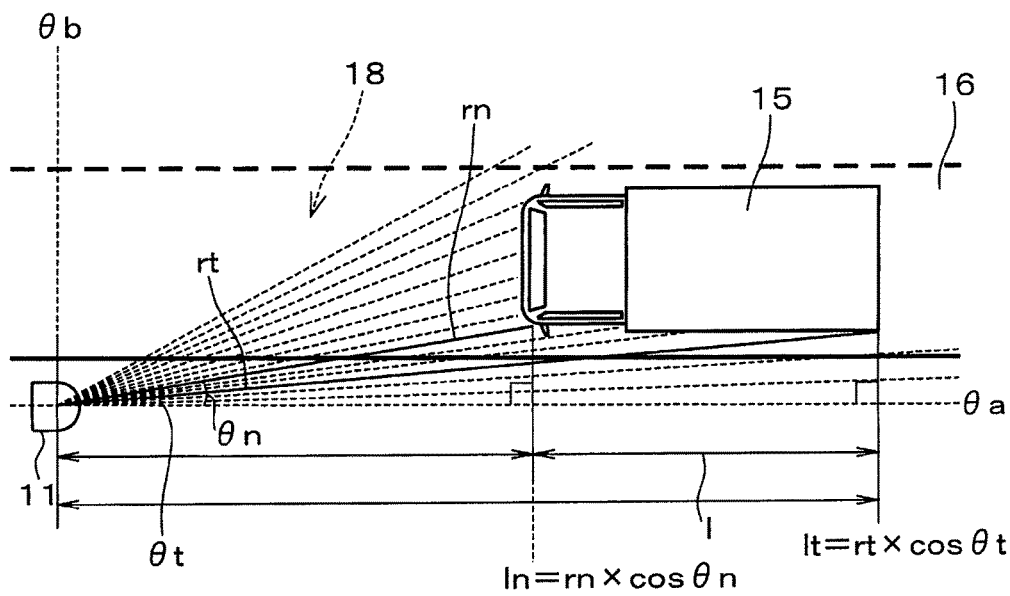
FIG. 9 is a diagram seen above a vehicle for explaining calculation of a length of the vehicle by the traffic measuring device.

The length calculation part 25 computes the length of the vehicle 15 as the length L using the detection distances included in the group of detection distances obtained by the distance acquisition part 23. As shown in FIG. 9, the shortest distance rn where the distance to the vehicle 15 serves as the shortest is included in the group of detection distances obtained by the distance acquisition part 23. The shortest distance rn and the corresponding shortest time irradiation angle θn are the same as the values used for calculating the width W.

The longest distance rt where the detection distance to the vehicle 15 serves as the longest at an irradiation angle smaller than the shortest time irradiation angle θn is included in the group of detection distances. The longest distance rt corresponds to the left rear end of the vehicle 15, when the vehicle 15 advances into the scan layer 18 from left in FIG. 9. Thus, the longest distance rt where the distance to the detected vehicle 15 serves as the longest at an irradiation angle smaller than the shortest time irradiation angle θn is included in the group of detection distances. Moreover, at this time, the irradiation angle at which the longest distance rt is detected is defined as a longest time irradiation angle θt that satisfies a relationship of θa<θt<θn.

The length calculation part 25 computes the length L using the shortest distance rn, the shortest time irradiation angle θn, the longest distance rt, and the longest time irradiation angle θt. Specifically, as shown in FIG. 9, a vehicle length l is equal to a difference between the back end position lt and the front end position ln of the vehicle 15, i.e., l=lt−ln, in the extending direction of the road 16. The vehicle length l is the full length of the vehicle 15 on appearance, and is different from the actual length L of the vehicle 15. That is, in this embodiment, as shown in FIG. 3 and FIG. 4, the sensor unit 11 forms the scan layer 18 inclined to the road surface 17 of the road 16. Therefore, in order to compute the actual vehicle length L, it is necessary to correct the vehicle length l using the inclination angle θs of the scan layer 18 formed by the sensor unit 11.

First, the calculation of the vehicle length l on appearance is explained. The shortest distance rn and the longest distance rt are the distances from the sensor unit 11 to the vehicle 15 in the inclined scan layer 18, and are respectively different from the front end position ln and the back end position lt of the vehicle 15. Then, the length calculation part 25 computes the front end position ln and the back end position lt in the extending direction of the road 16 using trigonometric functions. The shortest distance rn, the shortest time irradiation angle θn, the longest distance rt, and the longest time irradiation angle θt are contained in the group of detection distances as mentioned above. That is, the front end position ln of the vehicle 15 is computable as ln=rn×cos θn. Moreover, the back end position lt of the vehicle 15 is computable as lt=rt×cos θt. The length calculation part 25 computes the vehicle length l on appearance as l=lt−ln. That is, the length calculation part 25 computes as l=rt×cos θt−rn×cos θn.

Figure 10:
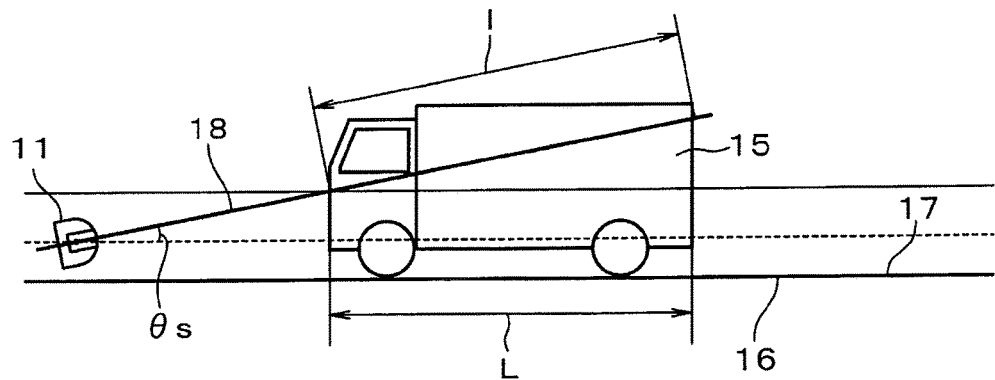
FIG. 10 is a diagram seen from a side of a vehicle for explaining calculation of a length of the vehicle by the traffic measuring device.

Furthermore, the length calculation part 25 computes the actual length L using the computed appearance vehicle length l and the inclination angle θs of the scan layer 18 formed by the sensor unit 11. As shown in FIG. 10, when the sensor unit 11 is located on the lower side near the road surface 17, the length calculation part 25 computes the actual length L as L=l×cos θs based on the vehicle appearance length l and the inclination angle θs of the scan layer 18.

Figure 11:
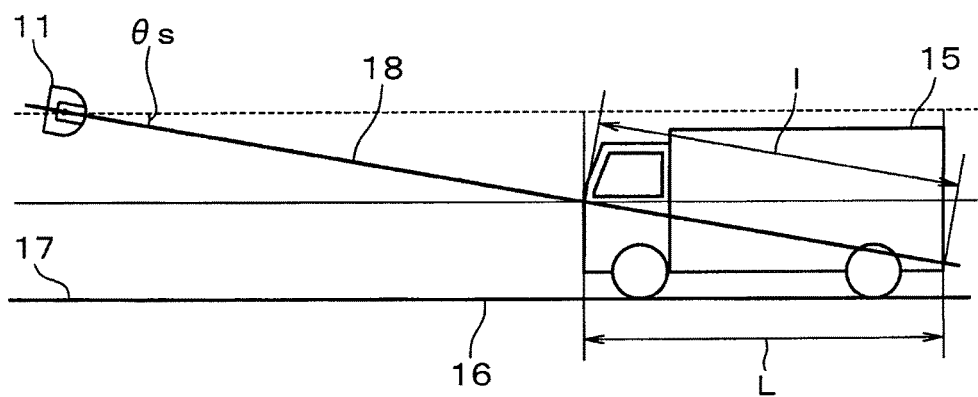
FIG. 11 is a diagram seen from a side of a vehicle for explaining calculation of a length of the vehicle by the traffic measuring device.

Moreover, as shown in FIG. 11, when the sensor unit 11 is located above the vehicle 15 far from the road surface 17, the length calculation part 25 computes the actual length Las L=l×cos θs based on the appearance length l and the inclination angle θs of the scan layer 18. Thus, the length calculation part 25 computes the vehicle length L of the vehicle 15 advanced in the scan layer 18 using the inclination angle θs of the scan layer 18, the shortest distance rn, the shortest time irradiation angle θn, the longest distance rt, and the longest time irradiation angle θt.

(Calculation of Height)

The height calculation part 26 computes the height of the vehicle 15 as the vehicle height H using the detection distances included in the group of detection distances obtained in the distance acquisition part 23. As shown in FIG. 3 and FIG. 4, the scan layer 18 formed by the sensor unit 11 inclines to the road surface 17. Therefore, the detection distances obtained by the distance acquisition part 23 includes information relevant to the height of the vehicle 15. The height calculation part 26 computes the vehicle height H using the information about the height contained in the detection distance.

Figure 12:
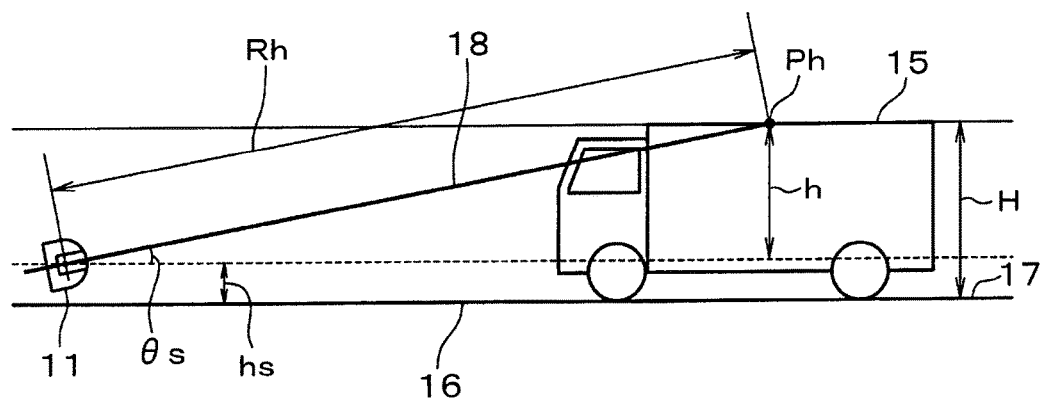
FIG. 12 is a diagram seen from a side of a vehicle for explaining calculation of a height of the vehicle by the traffic measuring device.
Figure 13:
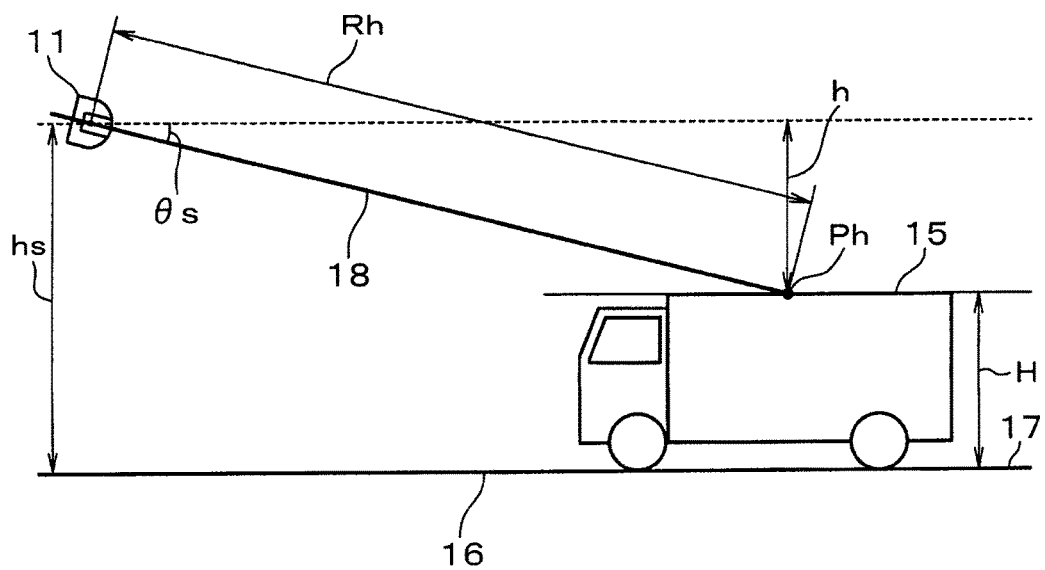
FIG. 13 is a diagram seen from a side of a vehicle for explaining calculation of a height of the vehicle by the traffic measuring device.
Figure 14:
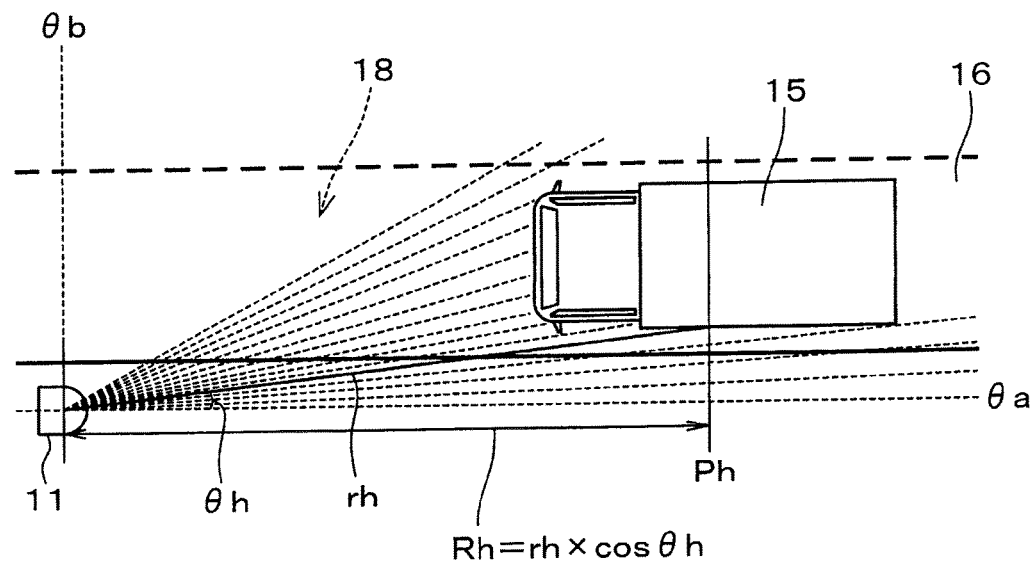
FIG. 14 is a diagram seen above a vehicle for explaining calculation of a height of the vehicle by the traffic measuring device.

The scan layer 18 of the laser light irradiated to the vehicle 15 inclines by the inclination angle θs to the road surface 17. Therefore, as shown in FIG. 12 and FIG. 13, when the scan layer 18 is seen from the lateral side of the vehicle 15, the highest position of the vehicle is detected as the detection highest position Ph. At this time, the detection highest position Ph is detected only as a position, not the information about the height from the road surface 17 or the sensor unit 11. When the scan layer 18 is seen from the upper side of the vehicle 15, as shown in FIG. 14, the irradiation angle corresponding to the detection highest position Ph is acquired as a highest time irradiation angle θh. At this time, the highest time irradiation angle θh satisfies a relation of θa<θh<θb. Moreover, the distance from the sensor unit 11 to the detection highest position Ph is acquired as the highest time detection distance rh. The height calculation part 26 computes the highest time distance Rh from the sensor unit 11 to the detection highest position Ph as Rh=rh×cos θh using the highest time irradiation angle θh and the highest time detection distance rh.

Since the scan layer 18 inclines by the inclination angle θs as shown in FIG. 12 and FIG. 13, the computed highest time distance Rh is the distance along the scan layer 18 from the sensor unit 11 to the detection highest position Ph. Then, the height calculation part 26 computes the height h from the position of the sensor unit 11 to the detection highest position Ph as h=Rh×sin θs using the highest time distance Rh and the inclination angle θs of the scan layer 18. This height h is equivalent to the distance from the sensor unit 11 to the detection highest position Ph which is the highest position of the vehicle 15. That is, the height h is equivalent to the maximum detection height. Then, the height calculation part 26 computes the vehicle height H by correcting the height h equivalent to the computed maximum detection height with the installation height hs of the sensor unit 11. The installation height hs from the road surface 17 is memorized by the storage part 22 as a known value.

As shown in FIG. 12, when the sensor unit 11 is located at the low position, i.e., located near the road surface 17, the height calculation part 26 computes the vehicle height H as H=h+hs by adding the installation height hs to the computed height h.

On the other hand, as shown in FIG. 13, when the sensor unit 11 is located at the high position higher than the upper end of the vehicle 15, i.e., located distant from the road surface 17, the height calculation part 26 computes the vehicle height H as H=hs−h by reducing the computed height h from the installation height hs. Thus, the height calculation part 26 computes the vehicle height H of the vehicle 15 which advanced within the scan layer 18 using the information on the height of each detection distance included in the group of detection distances and the installation height hs of the sensor unit 11. Also in this case, the installation height hs is memorized by the storage part 22 as a known value.

(Calculation of Speed)

Figure 15:
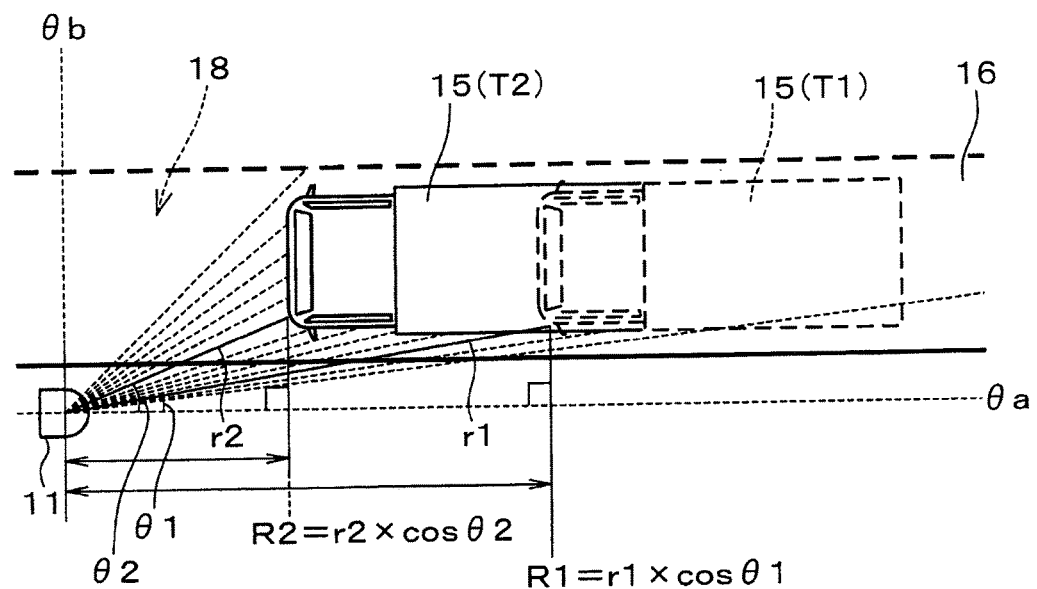
FIG. 15 is a diagram seen above a vehicle for explaining calculation of a speed of the vehicle by the traffic measuring device.

The speed calculation part 27 computes the speed of the vehicle 15 as the speed V using the detection distances included in the group of detection distances obtained in the distance acquisition part 23. The distance acquisition part 23 acquires the distance to the target vehicle 15 at a predetermined scanning cycle using the laser light irradiated from the irradiation part 13. Therefore, the speed calculation part 27 computes the speed V using the travel distance of the vehicle 15 which moves within this scanning cycle. When the vehicle 15 advances into the scan layer 18 from left in FIG. 15 and FIG. 16, the vehicle 15 moves leftward during a time period from the previous scanning cycle T1 to the next scanning cycle T2. Therefore, the distance R1 from the sensor unit 11 to the vehicle 15 corresponding to the scanning cycle T1 becomes larger than the distance R2 from the sensor unit 11 to the vehicle 15 corresponding to the scanning cycle T2.

Figure 16:
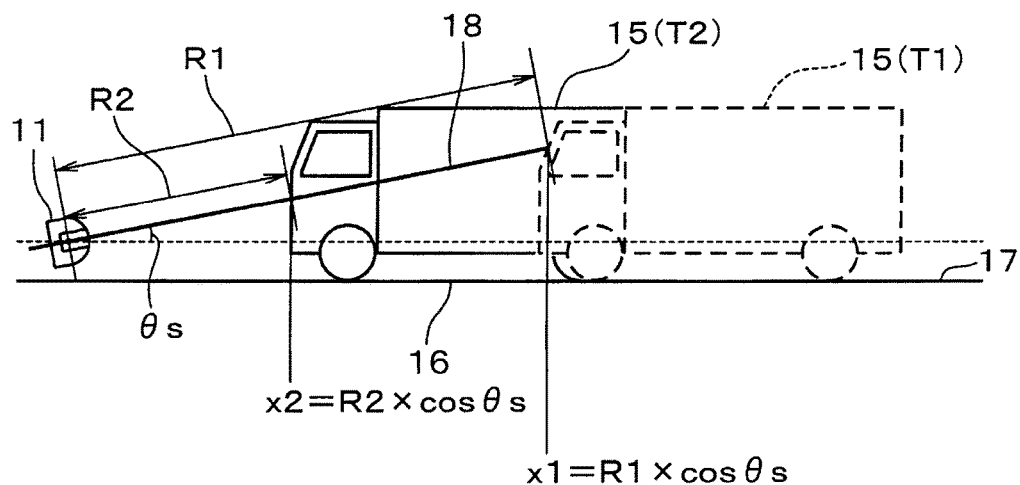
FIG. 16 is a diagram seen from a side of a vehicle for explaining calculation of a speed of the vehicle by the traffic measuring device.

Specifically, the distance acquisition part 23 acquires the shortest distance r1 included in the group of detection distances in the scanning cycle T1. Moreover, the distance acquisition part 23 acquires the shortest distance r2 included in the group of detection distances in the scanning cycle T2. The irradiation angle at which the shortest distance r1 is detected in the scanning cycle T1 is defined as a first irradiation angle θ1. The irradiation angle at which the shortest distance r2 is detected in the scanning cycle T2 is defined as a second irradiation angle θ2. The speed calculation part 27 computes the distance R1 to the vehicle 15 in the scanning cycle T1 as R1=r1×cos θ1, and the distance R2 to the vehicle 15 in the scanning cycle T2 as R2=r2×cos θ2, using the shortest distance r1, the shortest distance r2, the first irradiation angle θ1, and the second irradiation angle θ2. In this case, as shown in FIG. 16, the scan layer 18 inclines by the inclination angle θs with respect to the road surface 17. Then, the speed calculation part 27 further computes the position x1 of the vehicle in the scanning cycle T1, and the position x2 of the vehicle in the scanning cycle T2.

As shown in FIG. 16, when the sensor unit 11 is installed at the position near the road surface 17 to define the scan layer 18 spreading upward, the speed calculation part 27 computes the position x1 of the vehicle 15 in the scanning cycle T1, and the position x2 of the vehicle 15 in the scanning cycle T2 as $$x1=R1\times\cos\theta s, \text{ and}$$

$$x2=R2\times\cos\theta s.$$

The speed calculation part 27 computes the speed V based on Formula 1 using the position x1 of the vehicle 15 in the scanning cycle T1 and the position x2 of the vehicle 15 in the scanning cycle T2. Formula 1 is convertible to Formula 2.

$$V = \frac{x1 - x2}{T2 - T1} = \frac{R1 \times \cos\theta s - R2 \times \cos\theta s}{T2 - T1} \quad \text{(Formula 1)}$$

$$V = \frac{r1 \times \cos\theta 1 - r2 \times \cos\theta 2}{T2 - T1} \cos\theta s \quad \text{(Formula 2)}$$

Figure 17:
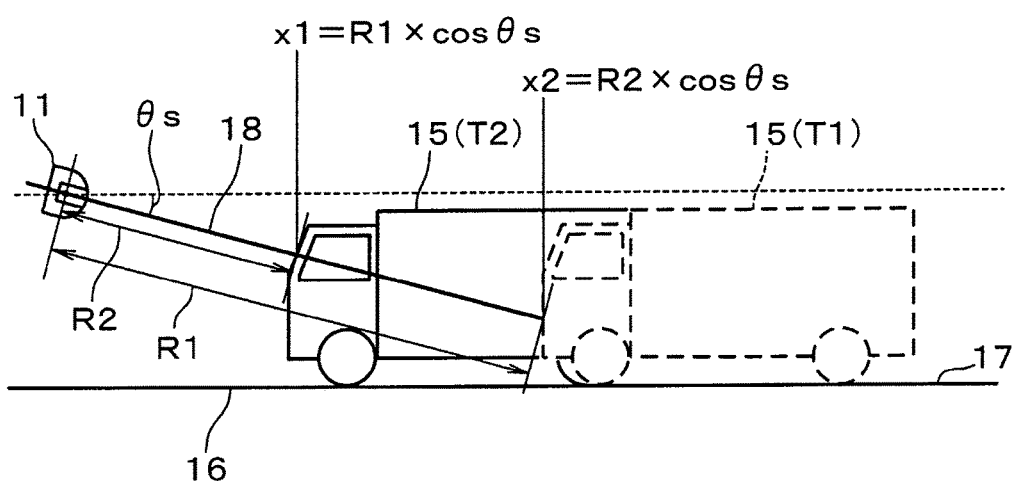
FIG. 17 is a diagram seen from a side of a vehicle for explaining calculation of a speed of the vehicle by the traffic measuring device.

The speed calculation part 27 computes the speed V using Formula 1 or Formula 2. Moreover, as shown in FIG. 17, when the sensor unit 11 is installed at a position distant from the road surface 17 to define the scan layer 18 spreading downward, the speed calculation part 27 computes the position x1 of the vehicle 15 in the scanning cycle T1 and the position x2 of the vehicle 15 in the scanning cycle T2 as x1=R1×cos θs and x2=R2×cos θs, respectively. The speed calculation part 27 computes the speed V using Formula 1 or Formula 2.

As mentioned above, the width calculation part 24, the length calculation part 25, the height calculation part 26, and the speed calculation part 27 respectively compute the width W, the length L, the height H, and the speed V of the vehicle, using the detection distances included in the group of detection distances acquired in the distance acquisition part 23 and the inclination angle θs of the scan layer 18.

According to the traffic measuring device 10 of the embodiment, the scan layer 18 formed by the irradiation part 13 inclines by the inclination angle θs to the road surface 17 of the road 16 on which the irradiation part 13 is disposed. That is, the scan layer 18 is not parallel to the road surface 17 of the road 16, and the inclination angle θs is defined between the scan layer 18 and the road surface 17. Therefore, the inclined scan layer 18 detects the distance of the vehicle 15 which passes through the scan layer 18 not only about the front surface but about the side (lateral) surface.

The sensor unit 11 which has the irradiation part 13 is located at either of the high position distant from the road surface 17 or the low position near the road surface 17. When the sensor unit 11 is at the low position near the road surface 17, it becomes easy to install the sensor unit 11. The sensor unit 11 can be installed for a short period of time. Moreover, when the sensor unit 11 is installed at the low position near the road surface 17 in this way, for example, it also becomes possible to mount the sensor unit 11 in a commercial (enterprise) vehicle. When the sensor unit 11 is disposed in such a vehicle, the sensor unit 11 can be carried to arbitrary places where the traffic may increase, while the traffic changes depending on the season. Therefore, emergency employment of the traffic measuring device 10 can be made easy, because the movement of the sensor unit 11 is easy.

When the sensor unit 11 is disposed at a high position distant from the road surface 17, the view range of the scan layer 18 can be increased while cost and time are needed for installation of the sensor unit 11. Therefore, the range of the road 16 measured by one set of the sensor unit 11 is expandable. Moreover, the damage caused by a collision by the vehicle 15 can be reduced when the sensor unit 11 is located at a high position. Further, the sensor unit 11 is less affected by growth of plant or weed. Therefore, measurement can be performed stably over the long period of time.

According to the embodiment, the width calculation part 24 computes the width W of the vehicle 15 which passes through the inclined scan layer 18 using the group of detection distances at a given irradiation angle acquired by the distance acquisition part 23. The width calculation part 24 computes the width W by processing with trigonometric functions, using the shortest distance rn, the shortest time irradiation angle θn, the longest distance rf, and the longest time irradiation angle θf based on the proximal position and the distal position from the sensor unit 11 on the front side of the vehicle 15. Therefore, the width W of the vehicle 15 can be acquired without addition of an apparatus for which new installation space is needed.

According to the embodiment, the length calculation part 25 computes the vehicle length L of the vehicle 15 which passes through the inclined scan layer 18 using the group of detection distances at a given irradiation angle acquired by the distance acquisition part 23. The length calculation part 25 computes the vehicle length L by processing with trigonometric functions, using the shortest distance rn, the shortest time irradiation angle θn, the longest distance rt, the longest time irradiation angle θt, and the inclination angle θs of the scan layer 18, based on the proximal position and the distal position from the sensor unit 11 on the lateral side of the vehicle 15. Therefore, the length L of the vehicle 15 can be acquired without addition of an apparatus for which new installation space is needed.

According to the embodiment, the height calculation part 26 computes the vehicle height H using the group of detection distances at a given irradiation angle acquired by the distance acquisition part 23 for the vehicle 15 which passes through the inclined scan layer 18. The height calculation part 26 corrects the maximum detection height acquired when the vehicle 15 passes the scan layer 18 by the installation height hs of the sensor unit 11. Thereby, the height calculation part 26 computes the vehicle height H. Therefore, the height H of the vehicle 15 can be acquired without addition of an apparatus for which new installation space is needed.

According to the embodiment, the speed calculation part 27 computes the speed V using the detection distances acquired by the distance acquisition part 23 from the scanning cycle T1 to the scanning cycle T2. Thereby, the speed V can be detected without addition of apparatus, together with the width W, the length L, or the height H of the vehicle 15.

According to the embodiment, the distance acquisition part 23 acquires the detection distance, after the whole vehicle 15 advances within the scan layer 18. The irradiation part 13 irradiates laser light towards the scan layer 18 at the predetermined scanning cycle. Therefore, there is a possibility that a group of detection distances may not be acquired relative to the whole vehicle 15 depending on the speed of the vehicle 15 advancing into the scan layer 18 or the irradiateable distance of the laser light. Then, the distance acquisition part 23 detects the detection distances at a given irradiation angle to obtain the group of detection distances, when it is confirmed that the whole vehicle 15 is located within the scan layer 18. Therefore, the information about the size of the vehicle 15 can be acquired more accurately.

In the embodiment, the vehicle 15 enters the scan layer 18 formed by the sensor unit 11 from left in FIG. 1. However, the vehicle 15 may advance from right relative to the scan layer 18 formed by the sensor unit 11, as shown in the upper side of FIG. 6. Even when the relation between the scan layer 18 and the vehicle 15 is reversed in a front-rear direction or a right-left direction, the width W, the length L, the height H, and the speed V of the vehicle 15 can be computed by applying the same concept described above.

Such changes and modifications are to be understood as being within the scope of the present disclosure as defined by the appended claims.

What is claimed is:

1. A traffic measuring device that measures a traffic around a vehicle travelling on a road, the traffic measuring device comprising:
an irradiation part disposed adjacent to the road to irradiate laser light at an irradiation angle of a predetermined interval to form a scan layer set in a virtual plane inclined upward or downward in a gravity direction as the laser light travels more distant from a road surface of the road;
a light receiving part disposed adjacent to the road to receive the laser light irradiated from the irradiation part and reflected by the vehicle;
a distance acquisition part that detects a distance to the vehicle as a detection distance for each irradiation angle using the laser light received by the light receiving part, the distance acquisition part acquiring a group of the detection distances relative to a whole of the scan layer, each of the irradiation angles being measured relative to a travelling direction of the vehicle; and
a width calculation part that computes a width of the vehicle using (i) a shortest distance which is the shortest among the group of the detection distances, (ii) a shortest time irradiation angle which is the irradiation angle corresponding to the shortest distance, (iii) a longest distance which is the longest among the group of the detection distances at the irradiation angle that is larger than the shortest time irradiation angle, and (iv) a longest time irradiation angle which is the irradiation angle corresponding to the longest distance,
the shortest distance being provided by a corner of a front end surface or a corner of a rear end surface of the vehicle adjacent to the light receiving part.

2. A traffic measuring device that measures a traffic around a vehicle travelling on a road, the traffic measuring device comprising:
an irradiation part disposed adjacent to the road to irradiate laser light at an irradiation angle of a predetermined interval to form a scan layer set in a virtual plane inclined upward or downward in a gravity direction as the laser light travels more distant from a road surface of the road;
a light receiving part disposed adjacent to the road to receive the laser light irradiated from the irradiation part and reflected by the vehicle;
a distance acquisition part that detects a distance to the vehicle as a detection distance for each irradiation angle using the laser light received by the light receiving part, the distance acquisition part acquiring a group of the detection distances relative to a whole of the scan layer, each of the irradiation angles being measured relative to a travelling direction of the vehicle; and
a length calculation part that computes a length of the vehicle using (i) a shortest distance which is the shortest among the group of the detection distances, (ii) a shortest time irradiation angle which is the irradiation angle corresponding to the shortest distance, (iii) a longest distance which is the longest among the group of the detection distances at the irradiation angle that is smaller than the shortest time irradiation angle, (iv) a longest time irradiation angle which is the irradiation angle corresponding to the longest distance, and (v) an inclination angle defined between the scan layer and the road surface,
the shortest distance being provided by a corner of a lateral surface of the vehicle adjacent to the light receiving part.

3. A traffic measuring device that measures a traffic around a vehicle travelling on a road, the traffic measuring device comprising:
an irradiation part disposed adjacent to the road to irradiate laser light at an irradiation angle of a predetermined interval to form a scan layer set in a virtual plane inclined upward or downward in a gravity direction as the laser light travels more distant from a road surface of the road;
a light receiving part disposed adjacent to the road to receive the laser light irradiated from the irradiation part and reflected by the vehicle;
a distance acquisition part that detects a distance to the vehicle as a detection distance for each irradiation angle using the laser light received by the light receiving part, the distance acquisition part acquiring a group of the detection distances relative to a whole of the scan layer, each of the irradiation angles being measured relative to a travelling direction of the vehicle; and
a height calculation part that computes a height of the vehicle by correcting a maximum detection height which is the highest among the group of the detection distances by an installation height from the road surface to the light receiving part.

4. The traffic measuring device according to claim 1, further comprising: a speed calculation part that computes a speed of the vehicle using at least two of the detection distances acquired by the distance acquisition part at a predetermined time interval.

5. The traffic measuring device according to claim 1, wherein the distance acquisition part acquires the detection distance, when a whole of the vehicle is located within the scan layer.

6. The traffic measuring device according to claim 2, further comprising: a speed calculation part that computes a speed of the vehicle using at least two of the detection distances acquired by the distance acquisition part at a predetermined time interval.

7. The traffic measuring device according to claim 2, wherein the distance acquisition part acquires the detection distance, when a whole of the vehicle is located within the scan layer.

8. The traffic measuring device according to claim 3, further comprising: a speed calculation part that computes a speed of the vehicle using at least two of the detection distances acquired by the distance acquisition part at a predetermined time interval.

9. The traffic measuring device according to claim 3, wherein the distance acquisition part acquires the detection distance, when a whole of the vehicle is located within the scan layer.

* * * * *